US008867159B1

(12) United States Patent
Madden

(10) Patent No.: US 8,867,159 B1
(45) Date of Patent: *Oct. 21, 2014

(54) METHOD AND READ MODULE FOR ADJUSTING A FREQUENCY AT WHICH A CONVERTER SAMPLES A READ SIGNAL BASED ON MOVEMENT OF CENTER OF A ROTATING STORAGE MEDIUM

(71) Applicant: Marvell International Ltd., Hamilton (BM)

(72) Inventor: Michael Madden, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/028,789

(22) Filed: Sep. 17, 2013

Related U.S. Application Data

(63) Continuation of application No. 13/625,427, filed on Sep. 24, 2012, now Pat. No. 8,537,483, which is a continuation of application No. 13/214,606, filed on Aug. 22, 2011, now Pat. No. 8,274,750, which is a continuation of application No. 12/335,017, filed on Dec. 15, 2008, now Pat. No. 8,004,784.

(60) Provisional application No. 61/019,053, filed on Jan. 4, 2008, provisional application No. 61/016,684, filed on Dec. 26, 2007.

(51) Int. Cl.
*G11B 5/09* (2006.01)

(52) U.S. Cl.
CPC .................. *G11B 20/1022* (2013.01)
USPC .......................................... 360/51

(58) Field of Classification Search
None
See application file for complete search history.

(56) References Cited

U.S. PATENT DOCUMENTS

| 4,918,677 | A | | 4/1990 | Ashinuma et al. | |
|---|---|---|---|---|---|
| 5,615,191 | A | * | 3/1997 | Takeda et al. | 360/51 |
| 5,905,705 | A | | 5/1999 | Takeda et al. | |
| 8,004,784 | B1 | | 8/2011 | Madden | |
| 8,274,750 | B1 | | 9/2012 | Madden | |
| 8,537,483 | B1 | * | 9/2013 | Madden | 360/51 |

* cited by examiner

*Primary Examiner* — Daniell L Negron

(57) ABSTRACT

A read module includes a clock that generates a clock signal. The clock signal oscillates at a frequency. A converter receives a read signal and samples the read signal based on the clock signal. The read signal includes first data read from a rotating storage medium. The estimation module, subsequent to a center of the rotating storage medium moving from a first location to a second location, estimates an offset distance or an offset angle. The offset distance is between the first location and the second location. The offset angle is between a first line and a second line. The first line extends between a location of the first data on the rotating storage medium and the second location. The second line extends between the first location and the second location. The adjustment module adjusts the frequency of the clock signal based on the offset distance or the offset angle.

21 Claims, 7 Drawing Sheets

METHOD AND READ MODULE FOR ADJUSTING A FREQUENCY AT WHICH A CONVERTER SAMPLES A READ SIGNAL BASED ON MOVEMENT OF CENTER OF A ROTATING STORAGE MEDIUM

CROSS-REFERENCE TO RELATED APPLICATIONS

This present disclosure is a continuation of U.S. application Ser. No. 13/625,427 (now U.S. Pat. No. 8,537,483), filed Sep. 24, 2012, which is a continuation of U.S. application Ser. No. 13/214,606 (now U.S. Pat. No. 8,274,750), filed on Aug. 22, 2011, which is a continuation of U.S. application Ser. No. 12/335,017 (now U.S. Pat. No. 8,004,784), filed on Dec. 15, 2008, which claims priority under 35 U.S.C. §119(e) to U.S. Provisional Application No. 61/016,684 filed on Dec. 26, 2007 and U.S. Provisional Application No. 61/019,053 filed Jan. 4, 2008. The entire disclosures of the applications referenced above are incorporated herein by reference.

FIELD

The present disclosure relates to rotating storage mediums and more particularly to sampling data read from rotating storage mediums.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Host devices such as computers, laptops, personal video recorders (PVRs), MP3 players, game consoles, servers, set-top boxes, digital cameras, and/or other electronic devices often need to store a large amount of data. Storage devices such as hard disk drives and/or other rotating storage devices may be used to meet these storage requirements.

Data is written on a rotating storage medium of a device in concentric circles that are referred to as tracks. Before performing a read or a write operation, a head locks onto a track by referring to positioning information called servo data. The servo data is generally prewritten on rotating storage medium. The servo data provides the positioning information so the head can be positioned at the location at which the read or write operation will occur.

The frequency at which data read from the track is sampled is set based on a radial distance of the track from a center location, an angular velocity of the rotating storage medium, and a linear density of the data of the track. Sampling the data read from the track at an appropriate frequency optimizes the quality of data recovered from the rotating storage medium.

SUMMARY

A read module is provided and includes a clock, a converter, an estimation module, and an adjustment module. The clock is configured to generate a clock signal. The clock signal oscillates at a frequency. The converter is configured to (i) receive a read signal, and (ii) sample the read signal based on the clock signal. The read signal includes first data read from a rotating storage medium. The estimation module is configured to, subsequent to a center of the rotating storage medium moving from a first location to a second location, estimate an offset distance or an offset angle. The offset distance is between (i) the first location of the center of the rotating storage medium and (ii) the second location of the center of the rotating storage medium. The offset angle is between a first line and a second line. The first line extends between (i) a location of the first data on the rotating storage medium and (ii) the second location of the center of the rotating storage medium. The second line extends between (i) the first location of the center of the rotating storage medium and (ii) the second location of the center of the rotating storage medium. The adjustment module is configured to adjust the frequency of the clock signal based on the offset distance or the offset angle.

In other features, a method is provided and includes: generating a clock signal, where the clock signal oscillates at a frequency; receiving a read signal; and sampling the read signal based on the clock signal, where the read signal includes first data read from a rotating storage medium. Subsequent to a center of the rotating storage medium moving from a first location to a second location, an offset distance or an offset angle is estimated. The offset distance is between (i) the first location of the center of the rotating storage medium and (ii) the second location of the center of the rotating storage medium. The offset angle between a first line and a second line. The first line extends between (i) a location of the first data on the rotating storage medium and (ii) the second location of the center of the rotating storage medium. The second line extends between (i) the first location of the center of the rotating storage medium and (ii) the second location of the center of the rotating storage medium. The frequency of the clock signal is adjusted based on the offset distance or the offset angle.

A read and write system comprising a mark detection module, an offset estimation module, and a frequency adjustment module. The mark detection module is configured to generate (i) a first mark indicator when first servo data is read from a storage medium, and (ii) a second mark indicator when second servo data is read from the storage medium. The offset estimation module is configured to estimate at least one of a first distance or an offset angle based on (i) a first location of the storage medium, and (ii) a period between times when the first mark indicator and the second mark indicator are generated. The frequency adjustment module is configured to adjust a sampling frequency at which user data is read from the storage medium based on the at least one of the first distance or the offset angle.

Further areas of applicability of the present disclosure will become apparent from the detailed description, the claims and the drawings. It should be understood that the detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
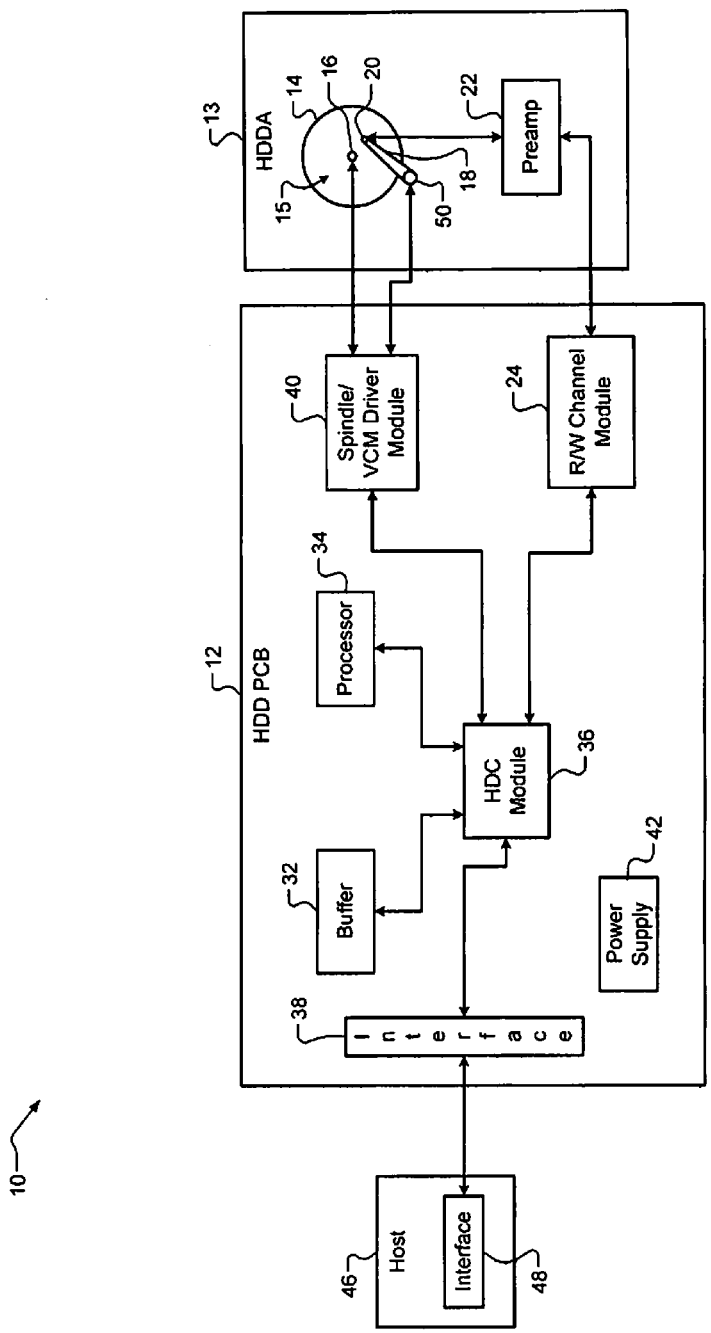
FIG. 1 is a functional block diagram of a hard disk drive (HDD) system.

The following description is merely exemplary in nature and is in no way intended to limit the disclosure, its disclosure, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The present disclosure relates to rotating storage mediums. Although the present disclosure will be discussed relative to a platter of a hard disk drive, the present disclosure is also applicable to other rotating storage mediums, such as optical storage mediums.

Data is written to a rotating storage medium as the medium rotates relative to a first center location. In some situations, the rotating storage medium may be rotated about a second center location that is offset from the first center location. A frequency adjustment system according to the present disclosure adjusts a sampling frequency for data read from the rotating storage medium based on a distance between the second center location and the read data.

Referring now to FIG. 1, a functional block diagram of an exemplary hard disk drive (HDD) system 10 is presented. The HDD system 10 includes a HDD printed circuit board (HDD PCB) 12 and a HDD assembly (HDDA) 13. The HDDA 13 includes one or more platters 14 that are each coated with a magnetic medium 15. The magnetic medium 15 stores positive and negative magnetic fields that represent data.

A spindle motor, shown schematically at 16, rotates the platters 14. Generally, the spindle motor 16 controls the platters 14 based on a predetermined operating speed (e.g., angular velocity) when data is being written to or read from the platters 14. For example only, the predetermined operating speed may be set to 3600, 7200, or 15000 revolutions per minute (rpm), although other speeds may be used. One or more read/write arms 18 move relative to the platters 14 to write data to or read data from the platters 14.

A read/write device 20 is located near a distal end of the read/write arm 18. The read/write device 20 includes a write element such as an inductor that generates a magnetic field. The read/write device 20 also includes a read element (such as a magneto-resistive (MR) head) that senses the magnetic field on the platters 14 and generates an analog read signal accordingly.

A preamplifier module 22 amplifies the analog read/write signals. More specifically, when reading data, the preamplifier module 22 amplifies the analog read signal from the read element and outputs the amplified signal to a read/write (R/W) channel module 24. When writing data, a write current is generated which flows through the write element of the read/write device 20. The write current is switched to produce a magnetic field having a positive or negative polarity. The positive or negative polarity is stored by the platters 14 and is used to represent data.

The HDD PCB 12 typically includes a buffer 32 that stores data that is associated with the control of the HDD system 10 and/or buffers data to allow data to be collected and transmitted as larger data blocks to improve efficiency. The buffer 32 may employ, for example, dynamic random access memory (DRAM), synchronous DRAM (SDRAM), double data rate (DDR), and/or any other type of memory having low latency. A processor 34 performs processing related to the operation of the HDDA 13 and various components of the HDD PCB 12.

The HDD PCB 12 further includes a hard disk control (HDC) module 36 that communicates with a host device 46 via an input/output (I/O) interface 38. The I/O interface 38 may be any suitable type of interface. For example only, the I/O interface 38 may be a serial or parallel interface, such as an Integrated Drive Electronics (IDE), Advanced Technology Attachment (ATA), or serial ATA (SATA) interface. The I/O interface 38 communicates with an I/O interface 48 that is associated with the host device 46.

The HDC module 36 also communicates with a spindle/voice coil motor (VCM) driver or module 40 and/or the read/write channel module 24. The spindle/VCM driver 40 controls the spindle motor 16 and, therefore, rotation of the platters 14. The spindle/VCM driver 40 also controls actuation of the read/write arm 18 and, therefore, position of the read/write arm 18 and the read/write device 20. For example only, the spindle/VCM driver 40 may control a voice coil actuator, a stepper motor, and/or any other suitable actuator 50 that controls the read/write arm 18. A power supply 42 supplies power for the HDD PCB 12 and/or the HDDA 13.

Figure 2:
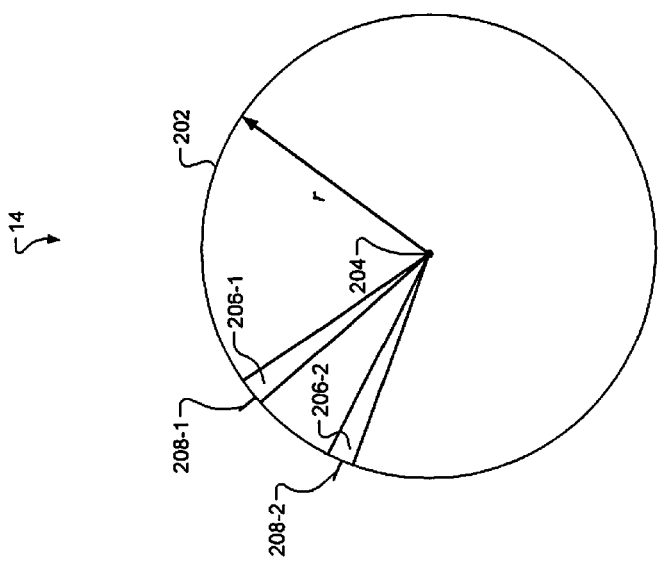
FIG. 2 is a platter of a hard disk drive assembly (HDDA)

FIG. 2 is an exemplary illustration of one of the platters of the HDDA 13. Data is typically written to the platter 14 in concentric circles that are referred to as tracks, such as track 202. Specifically, the tracks are written to the platter 14 rotationally relative to a center location 204 (hereafter referred to as first center location 204). The platter 14 includes a predetermined number of servo wedges 206-1, 206-2, ..., 206-N (hereafter referred to as servo wedges 206). Although only the two servo wedges 206-1 and 206-2 are shown, the platter 14 may include any suitable number of the servo wedges 206.

Before reading data from or writing data to the platter 14, a head locks onto the track 202 by referring to positioning information called servo data. The servo data provides the positioning information so the head can be precisely positioned at a given location (e.g., track and sector) at which the read or write operation will occur. The servo wedges 206 and the servo data are prewritten to the platter 14. More specifically, the servo data is prewritten to each of the servo wedges 206. The servo data of each of the servo wedges 206 may include, for example, a servo sync mark (SSM) field, track/sector identification (ID) field, position error sync (PES) field, and/or any other suitable data or field.

A specified component of the servo data of each of the servo wedges 206 is used as an indicator for that servo wedge. For example only, marks 208-1, 208-2, ..., and 208-N (hereafter referred to as marks 208) correspond to the specified component of the servo data of the servo wedges 206-1, 206-2, ..., and 206-N, respectively. The marks 208 may correspond to any suitable component of the servo data, such as the SSMs of the associated servo wedges 206.

The frequency at which data is read from the track 202 (i.e., sampled) is determined based on a distance (e.g., a radial distance) of the track 202 from the first center location 204, the angular velocity of the platter 14, and the linear density of the data of the track 202. For example only, the sampling frequency may be determined based on the equation:

$$f = 2*\Pi*r*S*D, \tag{1}$$

where f is the sampling frequency (e.g., bits/sec), r is the radial distance between the track 202 and the first center location 204 (e.g., in), S is the angular velocity of the platter 14 (e.g., revolutions/sec), and D is the linear density of the data (e.g., bits/in). This frequency (i.e., f) is referred to as a nominal frequency. Sampling data read from the platter 14 at the nominal frequency generally ensures that the data is read at the same quality (e.g., 24-bit) that data was written.

Figure 3:
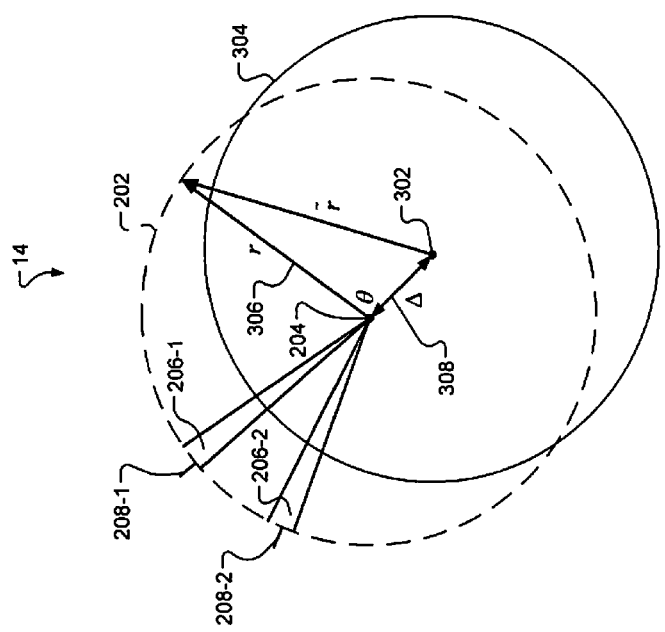
FIG. 3 is a platter having an offset.

FIG. 3 is an exemplary illustration of a circumstance when the platter 14 is offset from the first center location 204 is shown. The platter 14 is offset from the first center location 204 and rotates about a second center location 302. For example only, offset may occur when the platter 14 is used in a device other than the device that recorded data onto the track 202. Offset may also occur when a device containing the platter 14 is bumped, dropped, or otherwise jarred.

An exemplary offset track 304 corresponds to the track 202 if the track 202 was written rotationally relative to the second center location 302. An offset distance (i.e., Δ) corresponds to the distance between the first and second center locations 204 and 302.

An offset angle (i.e., Θ) corresponds to the angle between a first line 306 from the first center location 204 to the data of the track 202 and a second line 308 between the first and second center locations 204 and 302. The offset angle may be measured in any suitable manner, such as counter-clockwise from the second line 308 to the first line 306. Sampling the data at the nominal frequency when the platter 14 is rotating relative to the second center location 302 generally causes the data to be read from the track 302 at a lower quality than the quality at which the data was written.

Figure 4:
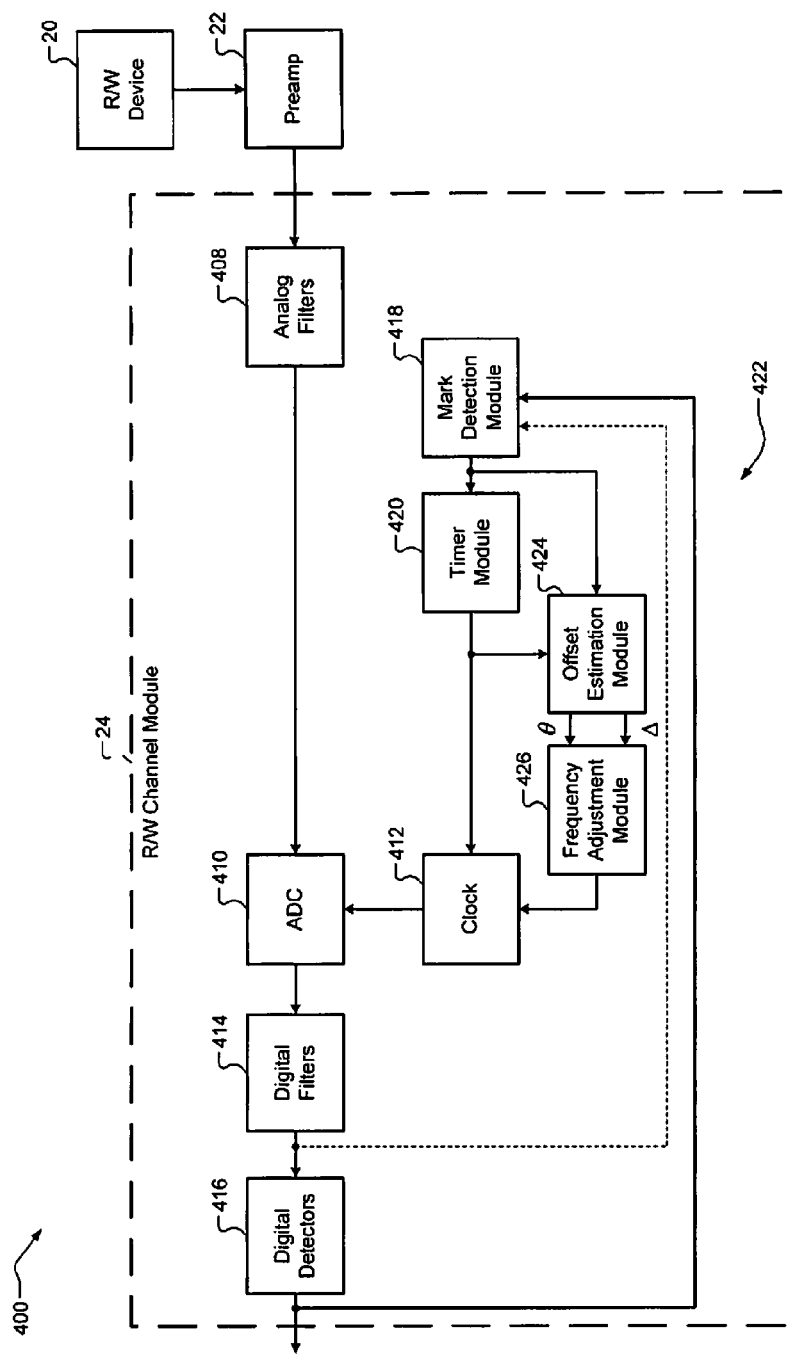
FIG. 4 is a functional block diagram of an exemplary implementation of a read/write channel system.

FIG. 4 is a functional block diagram of exemplary implementation of a read/write system 400. A read element (such as a magneto-resistive (MR) head) of the read/write device 20 senses magnetic fields on the platter 14 and generates an analog read signal accordingly. In one implementation, the read element generates the analog read signal based on data read from the platter 14. The preamplifier module 22 amplifies the analog read signal and outputs an amplified read signal to the read/write channel module 24.

The read/write channel module 24 includes analog filters 408, an analog-to-digital converter (ADC) module 410, a clock 412, digital filters 414, and digital detectors 416. The read/write channel module 24 also includes a mark detection module 418 and a timer module 420. Further, the read/write channel module 24 includes an offset estimation module 424, and a frequency adjustment module 426.

The analog filters 408 filter the amplified read signal provided by the preamplifier module 22 and provide the filtered read signal to the ADC module 410. The ADC module 410 samples the filtered read signal at a sampling frequency set by the clock 412. For example only, the clock 412 may provide pulses to the ADC module 410 corresponding to the sampling frequency. While not shown, when writing data, the read/write channel module 24 also writes the data to the platter 14 based on the frequency set by the clock 412.

The digital filters 414 filter the samples provided by the ADC module 410 and provide the filtered samples to the digital detectors 416. The digital detectors 416 process the filtered samples into a data bit sequence. For example only, the digital detectors 416 may process the filtered samples into data bit sequence of binary ones and zeros. The digital detectors 416 output the data bit sequence to a controller, which may then output the data bit sequence to the host device 46, the buffer 32, the processor 34, and/or other suitable module or device.

The clock 412 sets the sampling frequency based on a period of time between predetermined marks or fields of servo data included on the platter 14. For example only, the clock 412 sets the sampling frequency based on the period of time between the marks 208. The mark detection module 418 generates a mark indicator when one of the marks 208 is read by the read element of the read/write device 20. In one implementation, the marks are detected based on an output the digital detectors 416. In another implementation, the marks are detected based on an output of the digital filters 414.

The timer module 420 receives the mark indicators and resets a timer value after each mark indicator is generated. For example only, the timer module 420 resets the timer value to a predetermined reset value, such as zero. The timer value is incremented as time passes. In this manner, the timer value corresponds to the period of time between two of the marks 208.

The clock 412 sets the sampling frequency for data read from the platter 14 based on the period of time between the marks 208. For example only, the clock 412 may decrease the sampling frequency when the period of time between two of the marks 208 increases. The clock 412 may also adjust the sampling frequency based on an output of the ADC 410, the digital filters 414, and/or the digital detectors 416.

A frequency adjustment system 422 according to the present disclosure estimates a distance between the second center location 302 and the data and adjusts the sampling frequency for the data based on that distance. More specifically, the frequency adjustment system 422 predicts a frequency offset based on the distance and adjusts the sampling frequency based on the frequency offset. In this manner, the frequency adjustment system 422 adjusts the sampling frequency for data read from the platter 14 to account for the offset.

The offset estimation module 424 reads the timer value when each mark indicator is generated and estimates the distance between the second center location 302 and the data based on the timer value. More specifically, the offset estimation module 424 may estimate the offset distance (i.e., Δ) and the offset angle (i.e., θ) based on the timer value when each mark indicator is generated. For example only, the offset estimation module 424 may estimate the offset distance and the offset angle based on the equation:

$$c^2 = a^2 + b^2 - 2*a*b*\cos(\theta), \tag{2}$$

where c is the length of a hypotenuse of a triangle, a and b are lengths of first and second sides of the triangle, and θ is the angle between the first and second sides of the triangle. From equation (2), the distance between the second center location 302 and the data may be determined using the equation:

$$\tilde{r}^2 = r^2 + \Delta^2 - 2*r*\Delta*\cos(\theta), \tag{3}$$

where $\tilde{r}$ is the distance between the second center location 302 and the data, r is the distance between the first center location 204 and the data, Δ is the distance between the first and second center locations 204 and 302 (i.e., the offset distance), and θ is the offset angle.

Taking the square root of equation (3), the distance between the second center location 302 and the data, the offset distance, and/or offset angle may also be determined using the equation:

$$\tilde{r} = \sqrt{r^2 + \Delta^2 - 2*r*\Delta*\cos(\theta)}. \tag{4}$$

To simplify the estimation of the offset angle and/or the offset distance, a wedge index value may be assigned to each of the servo wedges 206.

The offset estimation module 424 may estimate the offset angle based on a current wedge index value (i.e., k), the total number of servo wedges 206, and an initial offset angle (i.e., $\theta_0$). The initial offset angle corresponds to the offset angle at a time zero, such as a time when the frequency adjustment system 422 is enabled. For example only, the frequency adjustment system 422 may be enabled when the HDDA 13 is powered up and/or when an event that may cause an offset is detected. Using the wedge index values, the offset angle may be expressed as:

$$\theta = \frac{2*\Pi*k}{N} - \theta_0, \qquad (5)$$

where k is the current wedge index value (1≤k≤N), N is the total number of servo wedges 206, and $\theta_0$ is the initial offset angle.

The offset estimation module 424 may estimate the offset distance and initial offset angle in any suitable manner. For example only, the offset estimation module 424 may store the period of time between each of the marks 208 over one or more revolutions of the platter 14. The periods may be indexed according to wedge index value. The offset estimation module 424 may then estimate the offset distance and the initial offset angle based on the stored periods, for example, using a regression analysis. In another implementation, the offset distance and/or angle for a given wedge may be estimated based on an average of a predetermined number (e.g., 100) of stored periods for that wedge.

In other implementations, the offset estimation module 424 may adaptively estimate the offset distance and the initial offset angle. For example only, the offset estimation module 424 may apply a least mean squared (LMS) adaptive filter and estimate the offset distance and the initial offset angle based on the timer value and one or more previous estimates. In one implementation, the offset estimation module 424 applies a LMS analysis and estimate the distance between the second center location 302 and the data based on the timer value and at least one previous estimate of the offset distance and the initial offset angle.

The offset estimation module 424 may be aided in estimating the offset distance and/or the initial offset angle by various parameters. For example only, from equations (3) and (4), the distance between the second center location 302 and the data will be a greatest distance when the offset angle is $\pi$ (i.e., 180° from the second line 308). Similarly, the distance between the second center location 302 and the data will be a shortest distance when the offset angle is 0 or $2\pi$ (i.e., 0° or 360°). The offset estimation module 424 provides the offset distance and the initial offset angle to the frequency adjustment module 426 when each mark indicator is generated.

The frequency adjustment module 426 determines a frequency offset based on the distance between the second center location 302 and the data. For example only, the frequency adjustment module 426 may predict the frequency offset based on the offset distance and the initial offset angle. The frequency adjustment module 426 adjusts the sampling frequency set by the clock 412 based on the frequency offset. In this manner, the frequency adjustment module 426 adjusts the sampling frequency to account for the offset.

For example only, the frequency adjustment module 426 may predict the frequency offset using the equation:

$$\tilde{f} = 2*\Pi*\tilde{r}*S*D, \qquad (6)$$

where $\tilde{f}$ is the frequency offset, $\tilde{r}$ is the distance between the second center location 302 and the data, S is the angular velocity of the platter 14, and D is the linear density of the data. Based on equations (4) and (5) above, the frequency offset may also be determined using the equation:

$$\tilde{f} = 2*\Pi*S*D*\sqrt{r^2 + \Delta^2 - 2*r*\Delta*\cos(\theta)}, \qquad (7)$$

where r is the distance between the data and the first center location 204, $\Delta$ is the offset distance, and $\theta$ is the offset angle. Substituting $\theta$ from equation (5) and reducing equation (7) further, the frequency offset may also be determined using the equation:

$$\tilde{f} = 2*\Pi*r*S*D*\sqrt{\frac{r^2}{r^2} + \frac{\Delta^2}{r^2} - \frac{2*\Delta}{r}*\cos\left(\frac{2*\Pi*k}{N} - \theta_0\right)}, \qquad (8)$$

where k is the current wedge index value assigned to the current servo wedge, N is the total number of servo wedges 206, and $\theta_0$ is the initial offset angle.

Assuming that $$\frac{\Delta}{r}$$

is small, the $$\frac{\Delta^2}{r^2}$$

term of equation (8) will be negligible, and the frequency offset may be predicted using the equation:

$$\tilde{f} = 2*\Pi*r*S*D*\sqrt{1 - \frac{2*\Delta}{r}*\cos\left(\frac{2*\Pi*k}{N} - \theta_0\right)}. \qquad (9)$$

The frequency adjustment module 426 may further reduce the frequency offset equation based on a Taylor series expansion of one or more components of equation (9). For example only, based on equation (9) and the Taylor series expression:

$$\sqrt{1-x} = 1 - \frac{1}{2}x - \frac{1}{8}x^2 - \frac{1}{16}x^3 - \ldots, \qquad (10)$$

the frequency offset may be predicted based on the equation:

$$\tilde{f} = 2*\Pi*r*S*D*\left[\left(1 - \frac{\Delta}{r}\right)*\cos\left(\frac{2*\Pi*k}{N} - \theta_0\right)\right]. \qquad (11)$$

The frequency adjustment module 426 may also normalize the frequency offset with respect to the nominal frequency (i.e., f). The nominal frequency corresponds to the frequency at which the data would be sampled if the platter 14 was rotating relative to the first center location 204. In other words, the nominal frequency corresponds to the frequency at which the data was written to the platter 14. For example only, the frequency adjustment module 426 may determine the normalized frequency using the equation:

$$f_{Norm} = \frac{\tilde{f}}{f} \approx \left(1 - \frac{\Delta}{r}\right) * \cos\left(\frac{2*\Pi*k}{N} - \theta_0\right), \quad (12)$$

where $f_{Norm}$ is the normalized frequency and f is the nominal frequency (i.e., f=2*π*r*S*D). Normalizing the frequency offset simplifies the estimation of the offset distance to determining minimum and maximum values of a sine wave and estimating based on those values. Normalizing the frequency offset also simplifies the estimation of the offset angle to estimating based on the minimum and maximum values and/or angles at which the sine wave becomes zero.

The frequency adjustment module 426 adjusts the sampling frequency set by the clock 412 based on the normalized frequency. For example only, the frequency adjustment module 426 may set the sampling frequency based on a product of the normalized frequency offset and the frequency of the clock 412.

Figure 5:
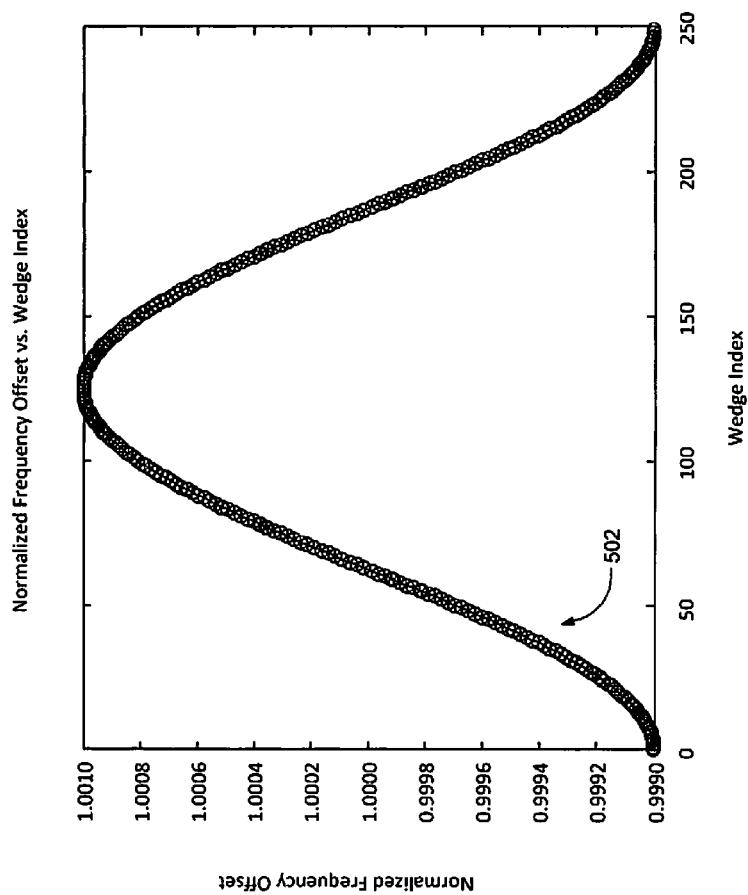
FIG. 5 is an exemplary illustration of normalized frequency offset as a function of wedge index value.

An exemplary illustration of normalized frequency offset as a function of servo wedge index value is presented in FIG. 5. Trace 502 corresponds to the normalized frequency offset when $$\frac{\Delta}{r}$$

is approximately 0.001 in., the initial offset angle is 0°, and the platter 14 includes 250 servo wedges. Trace 502 is plotted based on an angular velocity of approximately 1.0 revolution per second and a linear density of approximately 1.0 bits/in.

Figure 6:
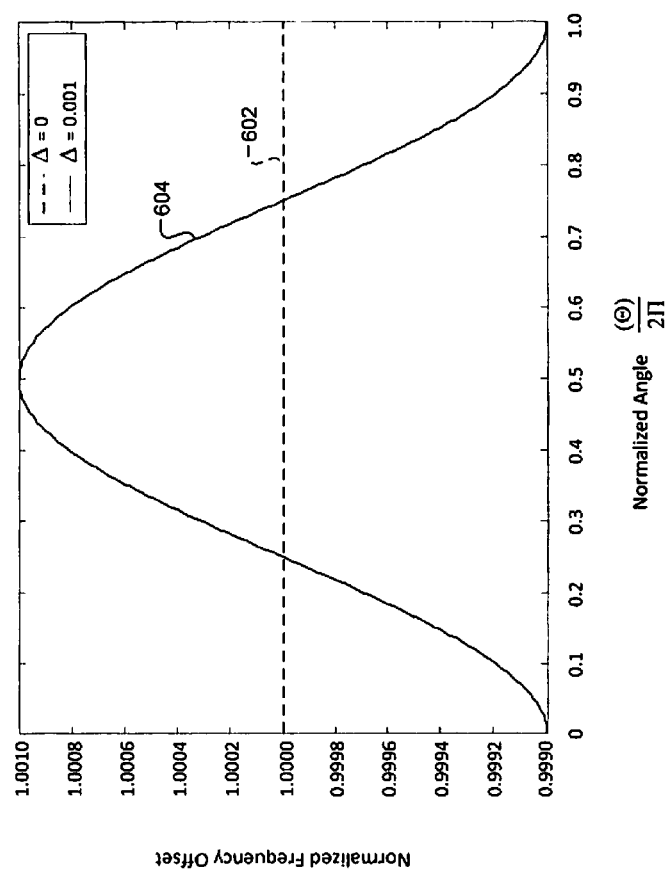
FIG. 6 is an exemplary illustration of normalized frequency offset as a function of normalized offset angle.

FIG. 6 depicts an exemplary illustration of normalized frequency offset as a function of normalized offset angle for two rotating storage mediums. The normalized offset angle corresponds to the offset angle divided by 2π (i.e., one revolution). Trace 602 corresponds to normalized frequency offset for a rotating storage medium without an offset. Accordingly, the normalized frequency offset is 1.0 and the sampling frequency is unadjusted.

Trace 604 corresponds to normalized frequency offset for a rotating storage medium having an offset distance of approximately 0.001 in. The frequency adjustment system 422 adjusts the sampling frequency for data the data of this rotating storage medium based on the normalized frequency offset at each offset angle.

Figure 7:
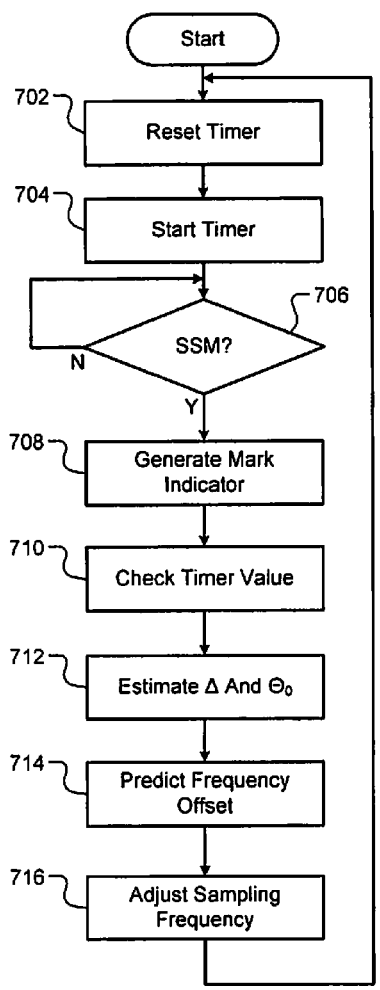
FIG. 7 is a flowchart depicting exemplary steps performed by a frequency adjustment system.

FIG. 7 illustrates a flowchart depicting exemplary steps performed by the frequency adjustment system 422. Control begins in step 702 where control resets the timer. In one implementation, control rests the timer value in step 702. Control may reset the timer value to a predetermined reset value, such as zero.

Control starts the timer in step 704. The timer value corresponds to the period of time that has passed since servo data of one of the servo wedges 206 has been read by the read/write device 20. In step 706, control determines whether the read/write device 20 has read servo data. If true, control continues to step 708. If false, control remains in step 706. For example only, control may continue to step 708 when the read/write device 20 reads an SSM of one of the servo wedges 206.

In step 708, control generates a mark indicator. In this manner, control generates a mark indicator each time that servo data of one of the servo wedges 206 is read by the read/write device 20. Control reads the timer value in step 710. Control estimates the offset distance and the initial offset angle in step 712.

Control predicts the frequency offset in step 714. More specifically, control predicts the frequency offset based on the offset distance and the initial offset angle. Control continues to step 716 where control adjusts the sampling frequency based on the frequency offset. Control may also normalize the frequency offset with respect to the nominal frequency before adjusting the sampling frequency. In this manner, control adjusts the sampling frequency based on the offset distance and the offset angle. Control then returns to step 702.

Figure 8:
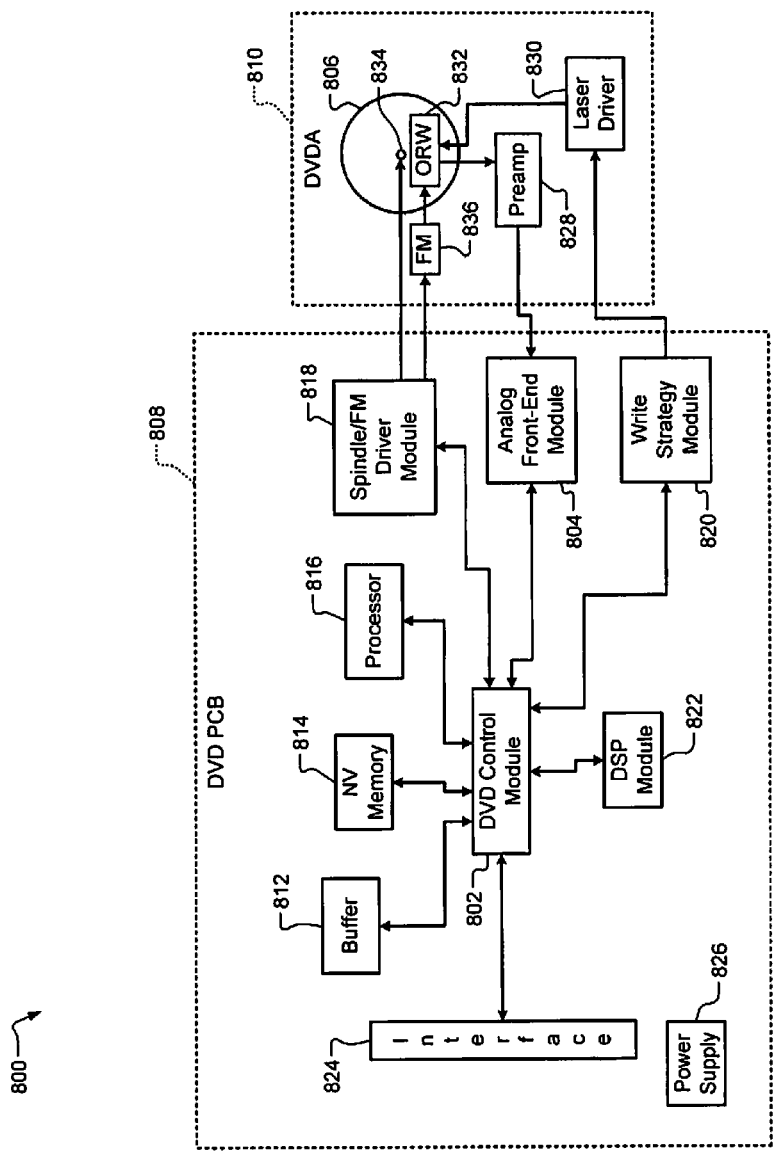
FIG. 8 is a functional block diagram of a DVD drive.

FIG. 8 illustrates a functional block diagram of an exemplary DVD drive 800. The principles of the present disclosure can be implemented in the DVD drive 800, a CD drive (not shown), and/or any other optical drive. For example, the principles of the present application may be implemented in a DVD control module 802 and/or in an analog front-end module 804 to adjust the sampling frequency at which data is read from an optical storage medium 806.

The DVD drive 800 includes a DVD PCB 808 and a DVD assembly (DVDA) 810. The DVD PCB 808 includes the DVD control module 802, the analog front-end module 804, a buffer 812, nonvolatile memory 814, a processor 816, a spindle/FM (feed motor) driver module 818, a write strategy module 820, and a DSP module 822.

The DVD control module 802 controls components of the DVDA 810 and communicates with an external device (not shown) via an I/O interface 824. The external device may include a computer, a multimedia device, a mobile computing device, etc. The I/O interface 824 may include wireline and/or wireless communication links.

The DVD control module 802 may receive data from the buffer 812, the nonvolatile memory 814, the processor 816, the spindle/FM driver module 818, the analog front-end module 804, the write strategy module 820, the DSP module 822, and/or the I/O interface 824. The processor 816 may process the data, including encoding, decoding, filtering, and/or formatting. The DSP module 822 performs signal processing, such as video and/or audio coding/decoding. The processed data may be output to the buffer 812, the nonvolatile memory 814, the processor 816, the spindle/FM driver module 818, the analog front-end module 804, the write strategy module 820, the DSP module 822, and/or the I/O interface 824.

The DVD control module 802 may use the buffer 812 and/or the nonvolatile memory 814 to store data related to the control and operation of the DVD drive 800. The buffer 812 may include DRAM, SDRAM, etc. The nonvolatile memory 814 may include any suitable type of semiconductor or solid-state memory, such as flash memory (including NAND and NOR flash memory), phase change memory, magnetic RAM, and multi-state memory, in which each memory cell has more than two states. The DVD PCB 808 includes a power supply 826 that provides power to the components of the DVD drive 800.

The DVDA 810 may include a preamplifier device 828, a laser driver 830, and an optical device 832, which may be an optical read/write (ORW) device or an optical read-only (OR) device. A spindle motor 834 rotates the optical storage medium 806, and a feed motor 836 actuates the optical device 832 relative to the optical storage medium 806.

When reading data from the optical storage medium 806, the laser driver provides a read power to the optical device 832. The optical device 832 detects data from the optical storage medium 806, and transmits the data to the preamplifier device 828. The analog front-end module 804 receives data from the preamplifier device 828 and performs such functions as filtering and A/D conversion. To write to the optical storage medium 806, the write strategy module 820 transmits power level and timing data to the laser driver 830. The laser driver 830 controls the optical device 832 to write data to the optical storage medium 806.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A read module comprising:
a clock configured to generate a clock signal, wherein the clock signal oscillates at a frequency;
a converter configured to (i) receive a read signal, and (ii) sample the read signal based on the clock signal, wherein the read signal includes first data read from a rotating storage medium;
an estimation module configured to, subsequent to a center of the rotating storage medium moving from a first location to a second location, estimate
an offset distance between (i) the first location of the center of the rotating storage medium and (ii) the second location of the center of the rotating storage medium, or
an offset angle between a first line and a second line, wherein the first line extends between (i) a location of the first data on the rotating storage medium and (ii) the second location of the center of the rotating storage medium, and wherein the second line extends between (i) the first location of the center of the rotating storage medium and (ii) the second location of the center of the rotating storage medium; and
an adjustment module configured to adjust the frequency of the clock signal based on the offset distance or the offset angle.

2. The read module of claim 1, further comprising:
a detection module configured to generate (i) a first indicator at a first time in response to the first data being read from the rotating storage medium, and (ii) a second indicator at a second time in response to second data being read from the rotating storage medium; and
a timing module configured to store a first value of a timer, wherein the first value of the timer indicates a first period between the first time and the second time, and
wherein the estimation module is configured to, based on the first period between the first time and the second time, estimate the offset distance or the offset angle.

3. The read module of claim 2, wherein:
the detection module is configured to generate a third indicator at a third time in response to third data being read from the rotating storage medium;
the timing module is configured to, based on the second indicator, (i) reset the timer, and (ii) store a second value of the timer;
the second value of the timer indicates a second period between the second time and the third time; and
the estimation module is configured to, based on a lean mean square estimate of a difference between (i) the first period between the first time and the second time and (ii) the second period between the second time and the third time, estimate the offset distance or the offset angle.

4. The read module of claim 1, wherein the estimation module is configured estimate (i) the offset distance based on a previous offset distance, or (ii) the offset angle based on a previous offset angle.

5. The read module of claim 1, wherein:
the estimation module is configured to estimate the offset distance and the offset angle; and
the adjustment module is configured to, based on the offset distance and the offset angle, adjust the frequency of the clock signal.

6. The read module of claim 1, further comprising a detection module configured to generate a plurality of indicators, wherein:
the detection module is configured to generate each of the plurality of indicators in response to corresponding data being read from the rotating storage medium;
the estimation module is configured to, based on a regression analysis, estimate the offset distance or the offset angle; and
the regression analysis is based on a predetermined number of periods between respective pairs of the plurality of indicators.

7. The read module of claim 1, wherein the estimation module is configured to estimate the offset angle based on:
a previous offset angle, wherein the previous offset angle is between a third line and a fourth line, wherein the third line extends between (i) a location of second data on the rotating storage medium and (ii) a third location of the center of the rotating storage medium, and wherein the fourth line extends between (i) the third location of the center of the rotating storage medium and (ii) the first location of the center of the rotating storage medium;
an index value assigned to (i) a first servo wedge of the first data, or (ii) a second servo wedge of the second data; and
a total number of servo wedges of the rotating storage medium.

8. The read module of claim 1, the estimation module is configured to estimate (i) the offset distance based on an average of a predetermined number of estimates of the offset distance, and (ii) the offset angle based on an average of a predetermined number of estimates of the offset angle.

9. The read module of claim 1, wherein the adjustment module is configured to (i) predict an offset value based on the offset distance, and (ii) adjust the frequency of the clock signal based on the offset value.

10. The read module of claim 9, wherein the estimation module is configured to normalize the offset value with respect to a nominal frequency at which the first data was written to the storage medium.

11. The read module of claim 1, wherein the converter is configured to receive the clock signal.

12. A method comprising:
generating a clock signal, wherein the clock signal oscillates at a frequency;
receiving a read signal;
sampling the read signal based on the clock signal, wherein the read signal includes first data read from a rotating storage medium;
subsequent to a center of the rotating storage medium moving from a first location to a second location, estimating
an offset distance between (i) the first location of the center of the rotating storage medium and (ii) the second location of the center of the rotating storage medium, or
an offset angle between a first line and a second line, wherein the first line extends between (i) a location of the first data on the rotating storage medium and (ii) the second location of the center of the rotating storage medium, and wherein the second line extends between (i) the first location of the center of the rotating storage medium and (ii) the second location of the center of the rotating storage medium; and adjusting the frequency of the clock signal based on the offset distance or the offset angle.

13. The method of claim 12, further comprising:

generating (i) a first indicator at a first time in response to the first data being read from the rotating storage medium, and (ii) a second indicator at a second time in response to second data being read from the rotating storage medium;

storing a first value of a timer, wherein the first value of the timer indicates a first period between the first time and the second time; and based on the first period between the first time and the second time, estimating the offset distance or the offset angle.

14. The method of claim 13, further comprising:

generating a third indicator at a third time in response to third data being read from the rotating storage medium;

based on the second indicator, (i) resetting the timer, and (ii) storing a second value of the timer, wherein the second value of the timer indicates a second period between the second time and the third time; and based on a lean mean square estimate of a difference between (i) the first period between the first time and the second time and (ii) the second period between the second time and the third time, estimating the offset distance or the offset angle.

15. The method of claim 12, further comprising estimating (i) the offset distance based on a previous offset distance, or (ii) the offset angle based on a previous offset angle.

16. The method of claim 12, comprising:

estimating the offset distance and the offset angle; and based on the offset distance and the offset angle, adjusting the frequency of the clock signal.

17. The method of claim 12, further comprising:

generating a plurality of indicators;

generating each of the plurality of indicators in response to corresponding data being read from the rotating storage medium; and based on a regression analysis, estimating the offset distance or the offset angle, wherein the regression analysis is based on a predetermined number of periods between respective pairs of the plurality of indicators.

18. The method of claim 12, further comprising estimating the offset angle based on:

a previous offset angle, wherein the previous offset angle is between a third line and a fourth line, wherein the third line extends between (i) a location of second data on the rotating storage medium and (ii) a third location of the center of the rotating storage medium, and wherein the fourth line extends between (i) the third location of the center of the rotating storage medium and (ii) the first location of the center of the rotating storage medium;

an index value assigned to (i) a first servo wedge of the first data, or (ii) a second servo wedge of the second data; and a total number of servo wedges of the rotating storage medium.

19. The method of claim 12, further comprising estimating (i) the offset distance based on an average of a predetermined number of estimates of the offset distance, and (ii) the offset angle based on an average of a predetermined number of estimates of the offset angle.

20. The method of claim 12, further comprising:

predicting an offset value based on the offset distance; and adjusting the frequency of the clock signal based on the offset value.

21. The method of claim 20, further comprising normalizing the offset value with respect to a nominal frequency at which the first data was written to the storage medium.

\* \* \* \* \*